No. 656,016.   Patented Aug. 14, 1900.
J. T. DONOHUE.
BALL BEARING SHEAVE.
(Application filed May 11, 1900.)

(No Model.)

Witnesses:
H. J. Meyer Jr.
F. S. Stitt.

Inventor:
John T. Donohue
By Chas. B. Mann
Attorney.

UNITED STATES PATENT OFFICE.

JOHN T. DONOHUE, OF BALTIMORE, MARYLAND.

BALL-BEARING SHEAVE.

SPECIFICATION forming part of Letters Patent No. 656,016, dated August 14, 1900.

Application filed May 11, 1900. Serial No. 16,253. (No model.)

*To all whom it may concern:*

Be it known that I, JOHN T. DONOHUE, a citizen of the United States, residing at Baltimore, in the State of Maryland, have invented certain new and useful Improvements in Ball-Bearing Sheaves, of which the following is a specification.

My invention is an improvement in the construction of ball-bearing sheaves; and one object is to provide a cheaply-made sheave whose body or rim portion can be made of comparatively - soft metal, while the parts which sustain the wear of the balls are composed of hardened steel and are capable of being adjusted to take up wear and may be removed when badly worn from the body portion of the sheave and replaced by new wearing parts.

A further object of the invention is to provide rings for holding the balls in place, which are adjustably as well as removably secured to the body portion of the sheave, so that the wear produced by the balls can be taken up, and which are held in any position to which they may be adjusted.

Reference is to be had to the accompanying drawings, in which—

Figure 1:
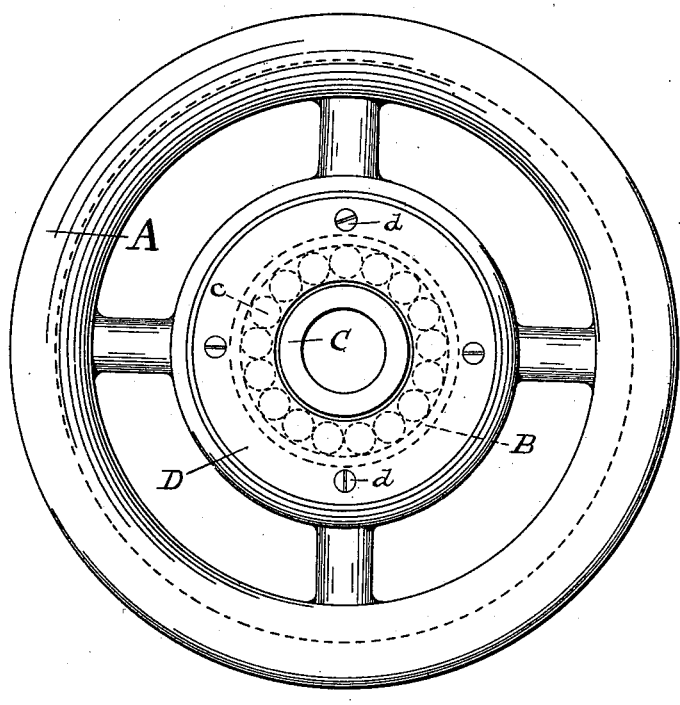
Figure 2:
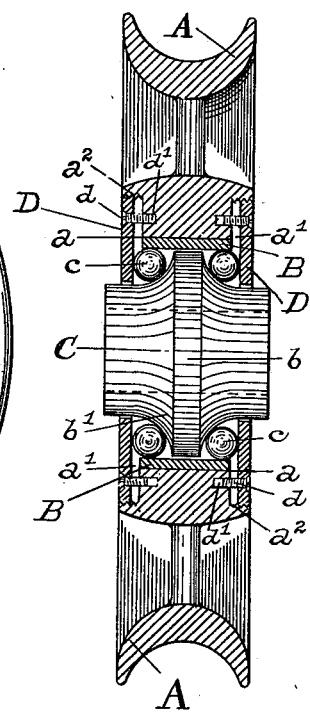

Figure 1 is a side view of a sheave embodying the features of my invention, parts of the bearing being indicated by dotted lines; and Fig. 2 is a diametrical section thereof.

Referring to the drawings, A designates the body or rim portion of a sheave, which may be of any preferred construction and material and which is provided with a central bore $a$ and a recess $a'$ in each side concentric to said bore, each recess having a screw-threaded wall $a^2$, as shown in Fig. 2.

B designates a bushing, which is formed of high-carbon steel or other hard metal and fits accurately and tightly in the central bore $a$ with its side edges flush with the bore ends or recesses.

C designates a hub, adapted to receive a spindle or shaft and which fits loosely inside the said bushing B and has a central circumferential flange $b$ and a tapering or cone surface $b'$ on each side of said flange, forming two races for the antifriction-balls $c$, which are interposed between the said tapered surfaces and the bushing B.

D designates two rings, also of hard metal, having their peripheries threaded and one of which is inserted over each end of the hub C and into screw-threaded engagement with the threaded wall $a^2$ of each side recess $a'$ of the body portion of the sheave, being secured from turning by screws $d$ or other detachable fastening devices inserted through the rings and into holes $d'$ in the body of the sheave. The screws $d$ are equidistant in a circle. The rings D, as shown in Fig. 2, are firmly held by the screw-threads $d^2$ and by the screws $d$ and contact with the balls $c$ and retain them in place and are of less thickness than the depth of the recesses $a'$, into which they fit, and by reason of their screw-threaded engagement with the threaded walls of said recesses the rings can be adjusted into the recesses so as to take up any wear produced by the balls. When this adjustment becomes necessary, the screws $d$ are first taken out and then the rings D given a sufficient number of quarter-turns in the recesses, when the screw-holes in the rings will again aline with the screw-holes $d'$ in the body of the sheave and permit the rings to be again fastened. It is manifest that any number of equidistant screws $d$ may be used, though I have shown four for each ring. The bushing B and the two rings D are made cheaply and may be tempered and require no expensive fitting up and constitute a construction that enables a good sheave to be made at low cost.

It will thus be seen that I have provided a sheave in which those parts which sustain the wear produced by the balls are removable and can be made of harder material than the body portion of the sheave and are so connected with the body portion of the sheave that when worn they can be readily adjusted or replaced.

I am aware that it is not broadly new to construct a sheave with a hub having a central circumferential flange and ball-races on each side thereof and a ring to retain the balls secured to one side of the sheave.

Having thus described my invention, what I claim as new, and desire to secure by Letters Patent, is—

A sheave comprising a body or rim portion formed with a central bore, a recess, $a'$, at each side of and concentric with said bore and having circumferentially screw - threaded walls; a bushing, B, in said bore; a hub loosely fitted in said bushing and formed with ball-races; two flat rings, D, of less thickness than the depth of said recesses and having their peripheries screw-threaded and engaged with said screw-threaded walls, whereby when the outer faces of said rings are flush with the sides of the sheave-body, spaces are provided between their inner faces and the inner walls of the said recesses; and antifriction-balls interposed between said bushing and hub.

In testimony whereof I affix my signature in the presence of two witnesses.

JOHN T. DONOHUE.

Witnesses:
CHAS. B. MANN, Jr.,
F. S. STITT.